United States Patent [19]

Aspden et al.

[11] Patent Number: 4,606,882
[45] Date of Patent: Aug. 19, 1986

[54] ROOF SUPPORT FOR LIQUID METAL COOLED FAST BREEDER NUCLEAR REACTOR

[75] Inventors: Garth J. Aspden, Bolton; Graham Chesworth, Warrington, both of England

[73] Assignee: National Nuclear Corporation Limited, London, England

[21] Appl. No.: 602,450

[22] Filed: Apr. 20, 1984

[30] Foreign Application Priority Data

Apr. 28, 1983 [GB] United Kingdom ............... 8311673

[51] Int. Cl.[4] .................................................. G21C 1/01
[52] U.S. Cl. ....................................... 376/463; 376/461; 376/205
[58] Field of Search ............... 376/461, 463, 403, 404, 376/405, 290, 205

[56] References Cited

U.S. PATENT DOCUMENTS 3,926,722 12/1975 Dupen .
4,326,920 4/1982 Facha et al. .
4,357,297 11/1982 Dupen .
4,367,194 1/1983 Schenewerk et al. .
4,460,539 7/1984 Andro et al. ..................... 376/461

OTHER PUBLICATIONS

Mynatt, F. R., Atomkernenerge, "Shielding Methods Development in the U.S.", vol. 30, No. 4, 1977, pp. 238-241.
Holmes, J. A. G., Nuclear Energy, Developments in UK Commercial Fast Reactor Design", vol. 20, No. 1, Feb. 1981, pp. 23-30.

Primary Examiner—Stephen C. Bentley
Assistant Examiner—John S. Maples
Attorney, Agent, or Firm—William R. Hinds

[57] ABSTRACT

A liquid metal cooled nuclear reactor of the kind in which the reactor core is disposed in a pool of liquid metal contained in the inner vessel of a double-walled steel tank supported in a vault having a roof the reactor has the roof supported by a conical support skirt carried by the wall of the vault, a single annular weld securing a main roof member to the skirt, and the conical skirt including a forked part providing inner and outer annular skirt portions from which the inner and outer vessels of the tank are carried respectively.

4 Claims, 3 Drawing Figures

ROOF SUPPORT FOR LIQUID METAL COOLED FAST BREEDER NUCLEAR REACTOR

BACKGROUND OF THE INVENTION

This invention relates to liquid metal cooled fast breeder nuclear reactors, and in particular to the structure and construction thereof.

One variation of such nuclear reactors has its core disposed in a pool of liquid metal (generally sodium) which is contained in the inner vessel of a double-walled steel tank supported in a vault and having a roof. Such a nuclear reactor is referred to hereafter as 'of the specified type'. The roof provides top shielding and from its outer (upper) side, control, instrumentation and refuelling operations can be effected. The roof also incorporates a rotatable shield to aid refuelling and is necessarily a large and massive structure. In earlier designs of this variation, the roof has been supported from the vault top by a vertical support skirt and the double-walled tank (the inner vessel of which is also known as the primary vessel and the outer vessel being the so-called 'guard' vessel) has been suspended from the roof from vertical annular members incorporated therein. It is necessary to construct and position the reactor internals before the roof is fitted, so that joints between the walls of the open-ended primary and guard vessels and the vessel-carrying annular members of the roof are amongst the final operations to be performed, these transition joints being established by welding. It will be appreciated that the welds when established carry the weight of each vessel and, additionally in the case of the primary vessel, its contents of core, coolant and other internals, and are thus in tension. Furthermore the diameter of the roof, which is a large capital item whose size is directly related to its cost, must be large enough to overlap the edges of the vault wall.

FEATURES AND ASPECTS OF THE INVENTION

According to the invention, in a nuclear reactor of the specified type, the roof is supported by a conical support skirt whose lower edge is carried by the wall of the vault, whose upper extremity is secured by a single annular weld to a single roof member incorporating the lower end wall and the outer cylindrical wall of the roof, and whose intermediate region has a forked part providing an inner annular skirt part welded to the upper end of the inner vessel wall, and an annular skirt portion welded to the upper end of the outer vessel wall.

Preferably, the cone angle is chosen so that the single annular weld referred to is completely in compression from the weight of the roof.

The lower edge of the conical skirt advantageously is supported by and secured by welding to a bracket carried by the vault wall and extending radially inwardly therefrom.

The said bracket can also be supported by a multiplicity of struts spaced around, and each embedded in, the vault wall.

DESCRIPTION OF THE DRAWINGS

A constructional example in embodying the invention will now be described with reference to the accompanying drawings, wherein.

DESCRIPTION OF THE PREFERRED EMBODIMENT

Figure 1:
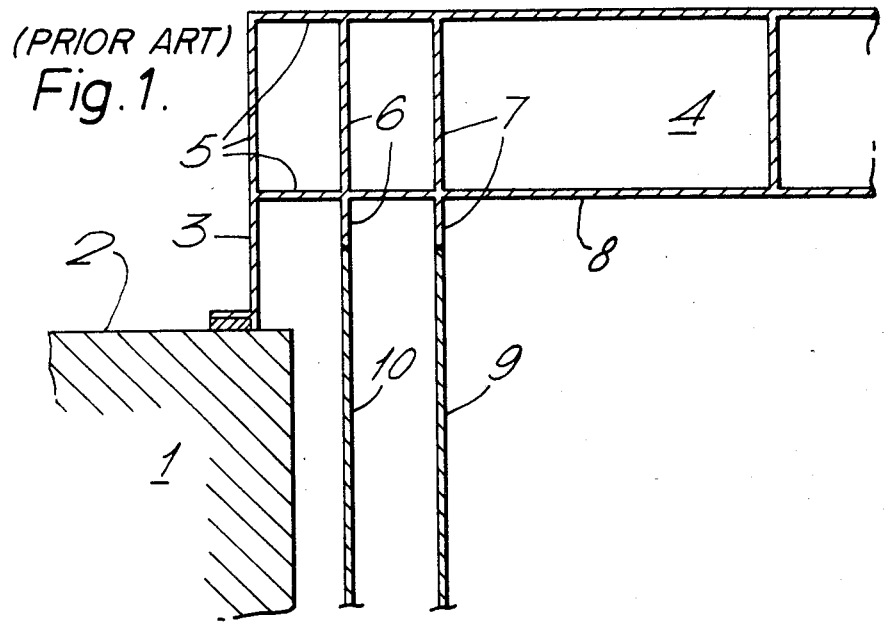
FIG. 1 is a diagrammatic, fragmentary, detached side view in medial section showing a former mode of construction.

Referring firstly to FIG. 1, there is illustrated therein as much of a former design proposal as is necessary for an understanding thereof. There is illustrated one side of a circular vault defined by a concrete wall 1 having an upper edge 2. Upon this edge is carried and secured an annular support skirt 3 by which a generally cylindrical roof structure 4 is carried. The roof structure 4 incorporates a framework 5 of vertical and horizontal metallic members preferably of a material such as carbon steel. It also incorporates vertical annular members 6, 7 which depend beneath the lower surface 8 of the roof 4 and are for the purpose of supporting the reactor tank of which the top 9 of the inner (primary) vessel is welded to and carried by the member 7, and the top 10 of the outer (guard) vessel is welded to and carried by the member 6.

When the reactor is being constructed, the internals of the tank are incorporated before the roof is fitted. When the time comes to fit the roof, the support skirt is placed in position on the vault wall edge 2 and secured, and the reactor tank walls 9 and 10 are welded to the members 7 and 6 respectively. It will be appreciated that these welds are placed in tension due to the weight of the reactor tank and its internals. Furthermore, the diameter of the roof 4 has to be such as to overlap the edges of the vault 1.

Figure 2:
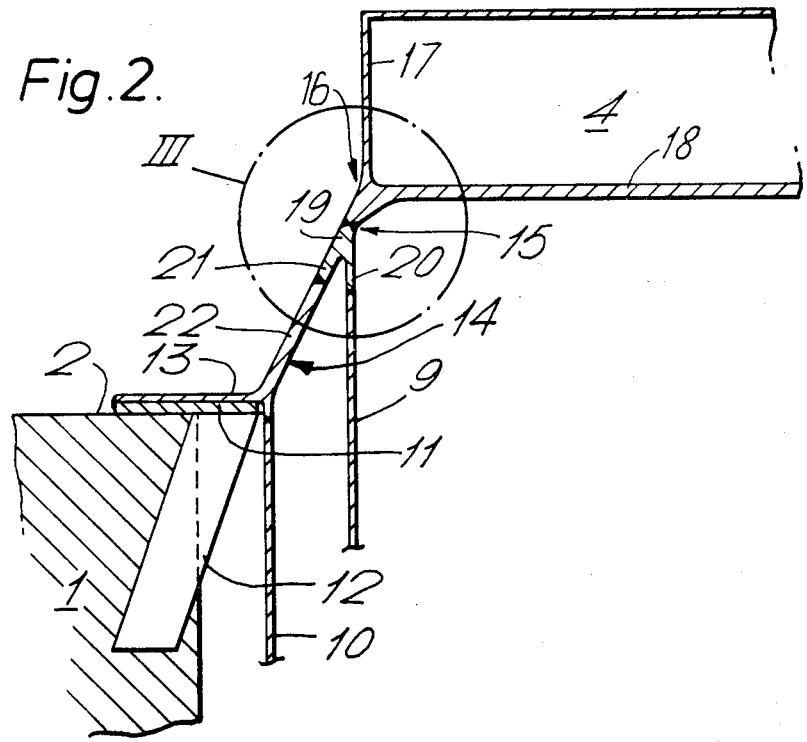
FIG. 2 is a similar view to that of FIG. 1 and illustrates an example of a construction according to the invention.
Figure 3:
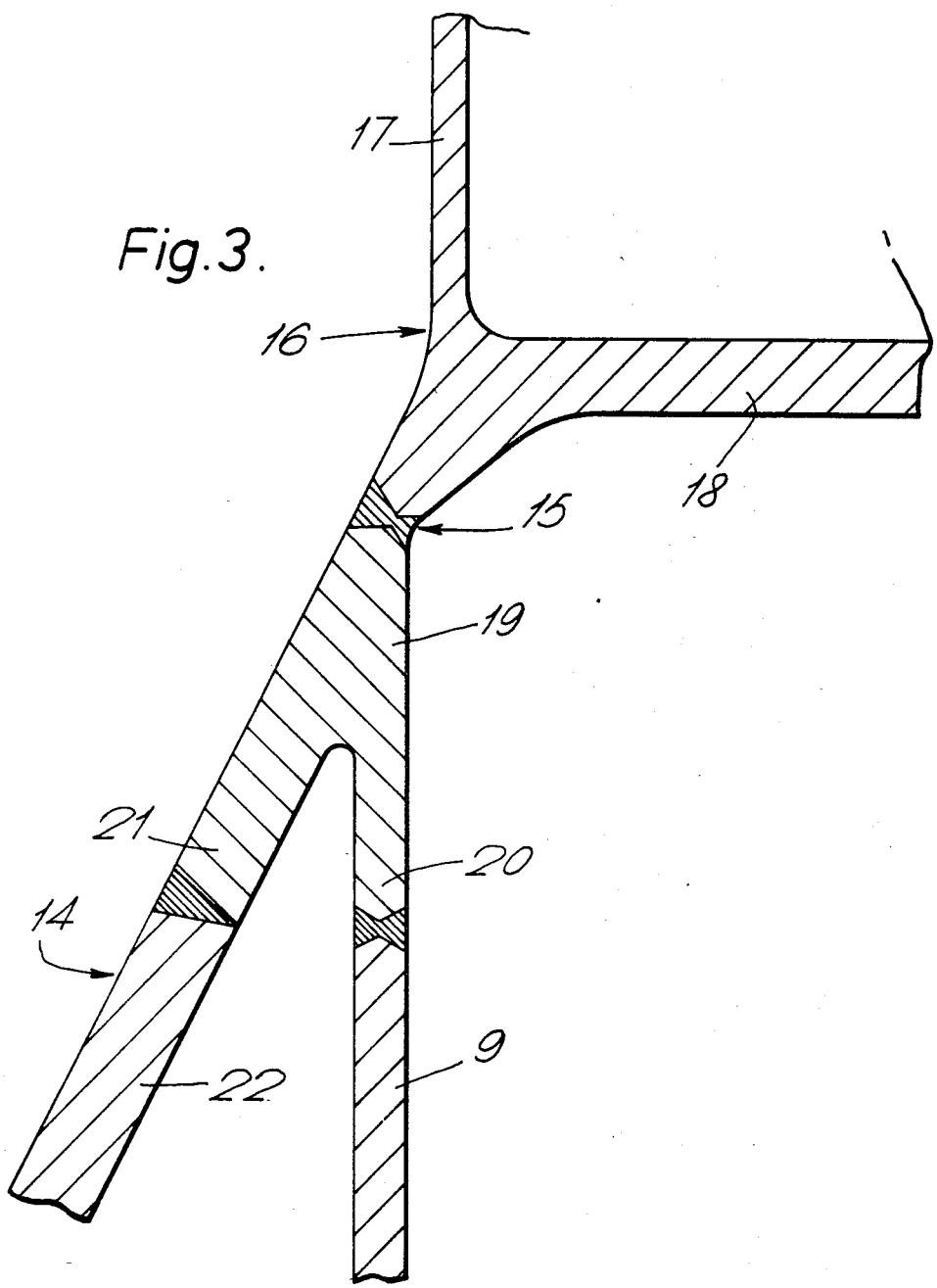
FIG. 3 is an enlarged, detached section incorporating that part of FIG. 2 within the circle.

Referring now to FIGS. 2 and 3 in which like reference numerals refer to like parts, the vault wall 1 has a bracket 11 extending inwardly from the vault wall edge and supported at intervals by a multiplicity of struts 12 embedded in the wall of the vault. A foot flange 13 of a support cone 14 is carried by and secured by welding to the bracket 11, the cone 14 being convergent upwardly. At its upper extremity, the cone member 14 is welded at 15 (see particularly FIG. 3) to a roof framework member 16 consisting of a vertical outer wall 17 and a horizontal roof lower extremity 18. The portion of the cone member 14 beneath the weld 15 consists of a branched portion 19 having an inner annular skirt portion 20 which is more or less vertical, and an outer annular skirt portion 21 inclined at the same angle as the forming part of cone 14. The portion 20 is welded to the top 9 of the inner (primary) vessel of the reactor tank and the portion 21 is welded to a part 22 of the cone 14, incorporating the foot flange 13 at its lower extremity. At that lower extremity, the upper end 10 of the outer (guard) vessel of the reactor tank is secured by an annular weld to flange 13. Thus it will be appreciated that the reactor tank is suspended from the support cone 14 by annular welds which are under tension, but the roof structure is secured to the support cone 14 by an annular weld 15 which, by suitable choice of the cone angle, can be arranged to be placed wholly in compression. It is also arranged that the final weld when applying the roof is that of weld 15, thereby obviating the necessity to perform two separate welding operations in the final, roof-sealing, operation. It is further advantageous, by virtue of the conical nature of the support cone 14, that the roof 4 can be made of lesser diameter than the roof 4 described with reference to the FIG. 1 construction. As seen in FIG. 2 there is a considerable saving in diameter, which is advantageous not only in the reduction of cost, but also in the reduction of weight which has to be carried by the vault 1. Furthermore, the transition weld 15 which is arranged to be in compression, is not included in those components whose integrity needs to be preserved in order to maintain support of the reactor core.

We claim:

1. In a liquid metal cooled fast breeder nuclear reactor having a double-walled steel tank comprising an inner vessel and an outer vessel, a core disposed in a pool of liquid metal contained in the inner vessel, a vault in which said tank is supported, and a roof for said vault, the improvement comprising a conical support skirt supporting the roof, the lower edge of the conical support skirt being carried by a wall of the vault, a single roof member secured by a single annular weld to the upper extremity of the conical support skirt, the roof member incorporating a lower end wall and an outer cylindrical wall of the roof, a forked part included in an intermediate region of the conical support skirt and providing an inner annular skirt portion welded to the upper end of the outer vessel wall, and an outer annular skirt portion welded to the upper end of the outer vessel wall.

2. A nuclear reactor according to claim 1, wherein the cone angle is such that the said single annular weld is completely in compression from the weight of the roof.

3. A nuclear reactor according to claim 1, wherein the lower edge of the conical skirt is supported by and secured by welding to a bracket carried by the vault wall and extending radially inwardly therefrom.

4. A nuclear reactor according to claim 3, wherein the said bracket is also supported by a multiplicity of struts spaced around and each embedded in the vault wall.

* * * * *